(12) United States Patent
Wei

(10) Patent No.: US 8,041,890 B2
(45) Date of Patent: Oct. 18, 2011

(54) METHOD FOR ACCESSING TARGET DISK, SYSTEM FOR EXPANDING DISK CAPACITY AND DISK ARRAY

(75) Inventor: Zhanming Wei, Zhejiang Province (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 646 days.

(21) Appl. No.: 12/097,253

(22) PCT Filed: Sep. 1, 2006

(86) PCT No.: PCT/CN2006/002258
§ 371 (c)(1),
(2), (4) Date: Jun. 12, 2008

(87) PCT Pub. No.: WO2007/118371
PCT Pub. Date: Oct. 25, 2007

(65) Prior Publication Data
US 2008/0307161 A1 Dec. 11, 2008

(30) Foreign Application Priority Data
Apr. 19, 2006 (CN) .......................... 2006 1 0066672

(51) Int. Cl.
*G06F 13/00* (2006.01)
*G06F 13/28* (2006.01)
*G06F 11/00* (2006.01)
*G06F 15/16* (2006.01)

(52) U.S. Cl. .................. 711/112; 711/E12.002; 714/31; 709/208

(58) Field of Classification Search .................. 711/112, 711/E12.002; 709/208
See application file for complete search history.

(56) References Cited

U.S. PATENT DOCUMENTS

| 6,381,675 | B1 | 4/2002 | Okada |
| 2002/0103943 | A1 | 8/2002 | Lo et al. |
| 2003/0229757 | A1 | 12/2003 | Hosoya et al. |
| 2004/0024962 | A1 | 2/2004 | Chatterjee et al. |

(Continued)

FOREIGN PATENT DOCUMENTS

CN 1447254 10/2003

(Continued)

OTHER PUBLICATIONS

International Search Report from corresponding International Application No. PCT/CN2006/002258, filed Sep. 1, 2006, search completed Sep. 25, 2006.

(Continued)

*Primary Examiner* — Edward Dudek, Jr.
(74) *Attorney, Agent, or Firm* — Ladas & Parry LLP

(57) ABSTRACT

The present invention discloses a method for accessing a target disk and a system for expanding disk capacity. A processing unit of a master disk array sends a command or data to a PCIe switching unit of the master disk array upon receipt of the command or data; the PCIe of the master disk array sends the received command or data to a control unit in a corresponding disk array according to an address of a target disk indicated in the command or data; the control unit in the corresponding disk array sends the received command or data to the target disk that is directly connected to the control unit. The present invention also discloses a master disk array and a slave disk array.

16 Claims, 7 Drawing Sheets

U.S. PATENT DOCUMENTS

| | | |
|---|---|---|
| 2005/0120176 A1 | 6/2005 | Maeda et al. |
| 2005/0198436 A1 | 9/2005 | Iida et al. |
| 2006/0047908 A1 | 3/2006 | Chikusa et al. |
| 2007/0088975 A1 * | 4/2007 | Ashmore et al. ............... 714/6 |
| 2007/0098001 A1 * | 5/2007 | Thomas ..................... 370/422 |

FOREIGN PATENT DOCUMENTS

| | | |
|---|---|---|
| CN | 1722074 A | 1/2006 |
| CN | 1753406 A | 3/2006 |
| EP | 1 544 721 A2 | 6/2005 |
| EP | 1544721 A2 * | 6/2005 |
| JP | 08-063423 A | 3/1996 |
| JP | 10-164544 A | 6/1998 |
| JP | 2000-187559 A | 7/2000 |
| JP | 2002-318725 A | 10/2002 |
| JP | 2005-136481 A | 5/2005 |
| JP | 2005-258798 A | 9/2005 |
| JP | 2005-309680 A | 11/2005 |
| JP | 2007-529813 A | 10/2007 |
| KR | 20030038293 A | 5/2003 |
| RU | 2 182 722 C2 | 6/1999 |
| WO | 2005/091154 A1 | 9/2005 |
| WO | 2006/002126 A2 | 1/2006 |

OTHER PUBLICATIONS

Russian Decision of Grant; Appln. No. 2008130859/09(038314).
European Search Report: issued Sep. 7, 2010; Appln. EP 06 77 5575.

* cited by examiner

METHOD FOR ACCESSING TARGET DISK, SYSTEM FOR EXPANDING DISK CAPACITY AND DISK ARRAY

FIELD OF THE INVENTION

The present invention relates to network storage technologies, and more particularly, to a method for accessing a target disk, a system for expanding disk capacity, and a disk array.

BACKGROUND OF THE INVENTION

The Storage Area Network (SAN) among the conventional network storage technologies is a dedicated high-speed sub-network that connects servers and disk arrays through a switching network. The disk arrays are mainly used to store vast data, and the servers are mainly used to read/write the disk arrays to obtain/store the data. In an SAN system, each of the servers can access any one of the disk arrays through the switching network, thereby greatly increasing availability of the data.

SAN systems may be classified to Fiber Channel (FC) SAN systems and Internet Protocol (IP) SAN systems. FIG. 1 is a schematic diagram illustrating the structure of an IP SAN system. Referring to FIG. 1, the IP SAN system is an SAN system that employs Internet Small Computer Systems Interface (iSCSI) protocol and is built over an Ethernet network. In the IP SAN system, servers are connected to storage controllers (SCs) through an Ethernet network, and the storage controllers are in turn connected to disk arrays through an Ethernet network.

Today, to meet the demand for mass storage due to a rapid growth in the amount of information, the capacity of the disk arrays must be expanded. FIG. 2 is a schematic diagram illustrating an IP SAN system for expanding disk capacity in the prior art. Referring to FIG. 2, each master disk array in the prior art are cascaded with multiple slave disk arrays in order to expand the disk capacity. The master disk array is connected to the slave disk arrays and the slave disk arrays are connected to each other via a Serial Attached SCSI (SAS) interface.

FIG. 3 is a schematic diagram illustrating the connection between a master disk array and slave disk arrays in the prior art. Referring to FIGS. 2 and 3, in the IP SAN system for expanding disk capacity, the master disk array includes an interface unit, a processing unit, a control unit, an expander and multiple disks. The slave disk arrays each include an expander and multiple disks. The master disk array is connected to the slave disk arrays and the slave disk arrays are connected to each other via their respective SAS Expanders.

FIG. 4 is a flow chart of accessing a target disk using the IP SAN system shown in FIG. 2 in the prior art. Referring to FIGS. 2, 3 and 4, when the server accesses the slave disk array 1, for example, the procedure of accessing the target disk using the conventional IP SAN system with expandable disk capacity includes the steps as follows.

In step 401, the server puts a command or data to be sent in an iSCSI protocol packet, encapsulates the iSCSI protocol packet, and sends the encapsulated iSCSI protocol packet to the storage controller (SC).

In step 402, the storage controller (SC) decapsulates the received iSCSI protocol packet to obtain the command or data, and performs relevant processing on the obtained command or data, such as mirroring or snapshot.

In step 403, the storage controller (SC) puts the obtained command or data in an iSCSI protocol packet, encapsulates the iSCSI protocol packet, and then sends the encapsulated iSCSI protocol packet to the master disk array through the Ethernet network.

It is noted that the storage controller (SC) may be removed from the IP SAN system shown in FIG. 2, that is, the server may be connected directly to the master disk array through the Ethernet network. In such a case, the steps 401 to 403 in the procedure shown in FIG. 4 may include that the server inputs the command or data to be sent in an iSCSI protocol packet, encapsulates the iSCSI protocol packet, and sends the encapsulated iSCSI protocol packet to the master disk array through the Ethernet network.

In step 404, the interface unit of the master disk array receives the iSCSI protocol packet, and sends the iSCSI protocol packet to the processing unit.

In step 405, the processing unit of the master disk array decapsulates the received iSCSI protocol packet and parses the iSCSI protocol to obtain the command or data, and sends the obtained command or data to the control unit.

The control unit described here and in the following disclosure may be an input/output processor (IOP) or a Serial Attached SCSI/Serial Advanced Technology Attachment (SAS/SATA) Controller.

In step 406, the control unit sends the command or data to the expander.

Here, the control unit is a core unit for controlling the implementation of the disk accessing procedure, and reads/writes and maintains the disks in the disk arrays by establishing physical connection channels to the disks via the respective expanders. In this step, the control unit executes the sending process using the established lower-layer physical connections.

In step 407, the expander of the master disk array searches a routing table stored on the expander itself for a port corresponding to the address of the target disk indicated in the received command or data, and sends via the port the received command or data to the expander of the slave disk array 1 on the next stage.

In step 408, the expander of the slave disk array 1 searches a routing table stored on the expander itself for a port corresponding to the address of the target disk indicated in the received command or data, and sends via the port the command or data to a disk (e.g., disk 1) directly connected to the expander.

In step 409, the disk 1 of the slave disk array 1 performs appropriate data processing, such as data reading/writing or data scanning, on the obtained command or data according to the obtained command or data.

It is seen from the above description that the prior art has the following drawbacks.

1. Among the master disk array and the slave disk arrays cascaded to the master disk array, only the master disk array includes a control unit that can control the access to the disks. In other words, the control unit of the master disk array needs to process the access commands or data reading/writing operations for all disks. Thus, during heavy disk access by one or more of the servers, a delay in processing or even service interruption or failure, etc. generally occurs in the control unit of the master disk array due to excessive service load, and therefore normal operation of the service can't be ensured.

2. Only the master disk array includes a control unit that can control the access to the disk arrays. Thus in case a failure occurs in the control unit, the servers can't access any of the disk arrays, resulting in a halt in the entire system.

3. The port-to-port delay in the expander is relatively long. For example, it spends the expander 450 ns in establishing a connection from one port to another port, while 180 ns in switching the data from one port to another port, thus severely degrading the rate of data access by the server to the disk arrays.

4. A routing table is stored in each of the expanders for storing information on the correspondence between address and ports for all disks. The expander forwards the command or data by searching the routing table. However, in the expander, the number of table entries that may be stored in the routing table is limited. Thus at most 64 slave disk arrays may be cascaded to the master disk array, thereby severely limiting the expansion of disk capacity.

SUMMARY OF THE INVENTION

In view of this, a primary object of the present invention is to provide a method for accessing a target disk and a system for expanding disk capacity. Another object of the present invention is to provide a master disk array and a slave disk array, in order to lower the service load on a control unit of the master disk array and ensure normal operation of the service.

To attain the above objects, the technical solutions of the present invention are implemented as follows.

An embodiment of the present invention provides a method for accessing a target disk. In the method for accessing a target disk, a Peripheral Component Interconnect Express, PCIe, switching unit is provided between a processing unit and a control unit of a master disk array, a PCIe switching unit and a control unit is provided in a slave disk array, and the disk arrays are connected to each other via their respective PCIe switching units. The method further includes:

A. obtaining, by the processing unit of the master disk array, a command or data, and sending, by the processing unit, the obtained command or data to the PCIe switching unit of the master disk array;

B. sending, by the PCIe switching unit of the master disk array, the command or data to a control unit in a corresponding disk array according to an address of the target disk indicated in the received command or data; and C. sending, by the control unit in the corresponding disk array, the received command or data to the target disk that is directly connected to the control unit in the corresponding disk array.

The method further includes: in each of the disk arrays, mapping addresses of all the disks in the disk array to an address space and storing the address space at a first port of the PCIe switching unit in the disk array via which the PCIe switching unit is connected directly to the control unit in the disk array, and mapping addresses of disks in all subsequently cascaded slave disk arrays to another address space and storing the another address space at a second port of the PCIe switching unit in the disk array via which the PCIe switching unit is connected to a PCIe switching unit on the next stage.

The step B includes:

B1. sending, by the PCIe switching unit of the master disk array, the received command or data to its first port and second port; and B2. determining, respectively by the first and second ports of the PCIe switching unit of the master disk array, whether the address of the target disk indicated in the received command or data is in the range of address space stored at their respective first and second ports; if the address is in the range of the address space, sending the received command or data directly to a control unit in a corresponding disk array, otherwise not forwarding the received command or data.

Another embodiment of the present invention provides a system for expanding disk capacity. The system includes at least one server, an Ethernet network, at least one master disk array and slave disk arrays cascaded to the master disk array, the server being adapted to put a command or data in an Internet Small Computer Systems Interface, iSCSI, protocol packet, encapsulate the iSCSI protocol packet, and send the encapsulated iSCSI protocol packet to an interface unit of the master disk array through the Ethernet network. The master disk array further comprises a processing unit, a Peripheral Component Interconnect Express, PCIe, switching unit, a control unit and at least one disk; in the master disk array, the PCIe switching unit is connected directly to the processing unit and the control unit respectively, and the control unit is directly connected to each of disks; the slave disk array comprises a PCIe switching unit, a control unit and at least one disk; in the slave disk array, the control unit is connected directly to the PCIe switching unit and each of disks; the disk arrays are directly connected to each other via their respective PCIe switching units.

The processing unit of the master disk array is adapted to obtain the command or data from the iSCSI protocol packet sent from the interface unit of the master disk array, and send the command or data to the PCIe switching unit of the master disk array.

The PCIe switching unit in each of the disk arrays is adapted to, upon receipt of the command or data, send the command or data to its first port via which the PCIe switching unit is connected directly to the control unit in the disk array and its second port via which the PCIe switching unit is connected to a PCIe switching unit on the next stage, and the received command or data is sent to a control unit in a corresponding disk array via the first port and the second port.

The control unit in any of the disk arrays is adapted to, upon receipt of the command or data, send the command or data to a target disk that is directly connected to the control unit, according to an address of the target disk indicated in the command or data.

The first port of the PCIe switching unit in each of the disk arrays is adapted to store an address space to which addresses of all disks in the disk array are mapped, and determine, upon receipt of the command or data, whether the address of the target disk indicated in the command or data is in the range of the address space stored at the first port; if the address of the target disk is in the range of the address space stored at the first port, the first port sends the received command or data to a control unit that is in the disk array and connected directly to the first port; and the second port of the PCIe switching unit in each of the disk arrays is adapted to store an address space to which addresses of all disks in the disk arrays on subsequent stages, and determine, upon receipt of the command or data, whether the address of the target disk indicated in the command or data is in the range of the address space stored at the second port; if the address of the target disk is in the range of the address space stored at the second port, the second port sends the received command or data to a PCIe switching unit that is in a disk array on a subsequent stage and is directly connected to the second port.

The PCIe switching unit is a PCIe switching chip with a PCIe interface and a switching network, or an Advanced Switching Interconnection, ASI, device in compliance with ASI architecture.

The control unit is an input/output processor, IOP, or a Serial Attached SCSI/Serial Advanced Technology Attachment, SAS/SATA, Controller.

The system may further comprise at least one storage controller, wherein the at least one server is connected to one of the at least one storage controller through the Ethernet network, and the storage controller is connected to the master disk array through the Ethernet network.

Another embodiment of the present invention provides a master disk array. The master disk array includes an interface unit, a processing unit, a Peripheral Component Interconnect Express, PCIe, switching unit, a control unit and at least one disk, wherein the PCIe switching unit is connected directly to the processing unit and the control unit respectively, and the control unit is connected directly to each of the at least one disk; and the processing unit is adapted to send a command or data to the PCIe switching unit upon receipt of the command or data;

the PCIe switching unit is adapted to send the received command or data to its first port via which the PCIe switching unit is connected directly to the control unit and its second port via which the PCIe switching unit is connected directly to a PCIe switching unit on a subsequent stage, and send the received command or data via the first port and the second port; and the control unit is adapted to, upon receipt of the command or data, send the command or data to a target disk that is directly connected to the control unit, according to an address of the target disk indicated in the command or data.

The first port of the PCIe switching unit is adapted to store an address space to which addresses of all disks of the master disk array are mapped, and determine, upon receipt of the command or data, whether the address of the target disk indicated in the command or data is in the range of the address space stored at the first port; if the address of the target disk is in the range of the address space stored at the first port, the first port sends the received command or data to the control unit of the master disk array.

The second port of the PCIe switching unit is adapted to store an address space to which addresses of all disks in slave disk arrays on subsequent stages, and determine, upon receipt of the command or data, whether the address of the target disk indicated in the command or data is in the range of the address space stored at the second port; if the address of the target disk is in the range of the address space stored at the second port, the second port sends the received command or data to a PCIe switching unit that is in an external slave disk array and is directly connected to the second port.

The PCIe switching unit is a PCIe switching chip with a PCIe interface and a switching network, or an Advanced Switching Interconnection, ASI, device in compliance with ASI architecture.

The control unit is an input/output processor, IOP, or a Serial Attached SCSI/Serial Advanced Technology Attachment, SAS/SATA, Controller.

Another embodiment of the present invention provides a slave disk array. The slave disk array includes a Peripheral Component Interconnect Express, PCIe, switching unit, a control unit and at least one disk, wherein the PCIe switching unit is connected directly to the control unit, and the control unit is connected directly to each of the at least one disk; and the PCIe switching unit is adapted to send a received command or data to its first port via which the PCIe switching unit is connected directly to the control unit and its second port via which the PCIe switching unit is connected directly to a PCIe switching unit on a subsequent stage, and send the received command or data via the first port and the second port; and the control unit is adapted to, upon receipt of the command or data, send the command or data to a target disk that is directly connected to the control unit, according to an address of the target disk indicated in the command or data.

The first port of the PCIe switching unit is adapted to store an address space to which addresses of all disks of the slave disk array are mapped, to determine, upon receipt of the command or data, whether the address of the target disk indicated in the command or data is in the range of the address space stored at the first port, and to send the received command or data to the control unit of the slave disk array if the address of the target disk is in the range of the address space stored at the first port.

The second port of the PCIe switching unit is adapted to store an address space to which addresses of all disks in slave disk arrays on subsequent stages, to determine, upon receipt of the command or data, whether the address of the target disk indicated in the command or data is in the range of the address space stored at the second port, and to send the received command or data to a PCIe switching unit that is in an external slave disk array and is directly connected to the second port if the address of the target disk is in the range of the address space stored at the second port.

The PCIe switching unit is a PCIe switching chip with a PCIe interface and a switching network, or an Advanced Switching Interconnection, ASI, device in compliance with ASI architecture.

The control unit is an input/output processor, IOP, or a Serial Attached SCSI/Serial Advanced Technology Attachment, SAS/SATA, Controller.

Another embodiment of the present invention provides a disk array. The disk array includes an expandable switching unit coupled to a processing module and a control unit coupled to the switching unit.

The expandable switching unit is a Peripheral Component Interconnect Express, PCIe, Switch.

It can be seen from the above solutions that the present invention has the following advantages.

1. The master disk array and each of slave disk arrays subsequently cascaded to the master disk array include a control unit that can control the access to the disks. In addition, when a disk in any of the disk arrays is accessed, the control unit in the disk array processes the access command or reads/writes the data. In this way, during heavy disk access by one or more of the servers, the access command processing or data reading/writing may be performed by different control units instead of only one control unit in the prior art. Therefore, the delay in processing or even service interruption or failure, etc. occurring in the prior art due to excessive service overload on the control unit may be avoided, and normal operation of the service may be ensured.

2. The master disk array and each of the slave disk arrays cascaded to the master disk array include a control unit that can control the access to the disks. Thus in case a failure occurs in any of the control units, the server's access to any other disk array is not affected, thereby further ensuring the normal operation of the service.

3. The port-to-port delay in the PCIe switching unit is very short (usually about 15 ns), thus the rate of data access by the server to the disk arrays may be increased greatly.

4. Only corresponding address space information needs to be stored at each of the ports in the PCIe switching unit such that the commands or data may be forwarded at any one the ports according to the corresponding address space stored at the port, instead of the address information of all disks being stored as required in the prior art. Therefore, the amount of address information that can be recorded by the PCIe switching unit may be increased greatly, so that the master disk array may be cascaded with more slave disk arrays, thereby further expanding the disk capacity.

5. A PCIe switching chip is used in the present invention to forward the commands or data, while in the prior art an Expander is used to forward the commands or data. The PCIe switching chip generally has a lower price over the Expander, thereby lowering the cost of the entire system.

DETAILED DESCRIPTION OF THE EMBODIMENTS

In the prior art, a service is often unable to be operated normally due to excessive service load on the control unit, and a failure occurring in the control unit may result in a halt in the entire system, because a centralized control approach is employed, that is, a control unit of a master disk array controls the access to all disk arrays. In order to eliminate the drawbacks of the prior art, a distributed control approach may be employed instead of the centralized control approach, that is, the access to different disk arrays may be controlled by different control units.

In addition, the Peripheral Component Interconnect Express (PCIe) protocol supports combination of multiple lanes and has multiple levels of QoS and information processing and congestion prevention mechanisms. Therefore in transmission of PCIe protocol packets, the data packets may be forwarded according to an ID route and an address route, without searching a routing table as in the prior art. Consequently the delay in the command and data transmission may be reduced significantly. Moreover, since both the processing unit and the control unit of the master disk array support PCIe interface, the data access rate may be increased greatly if PCIe switching devices are employed to transmit commands or data between the disk arrays.

Figure 1:
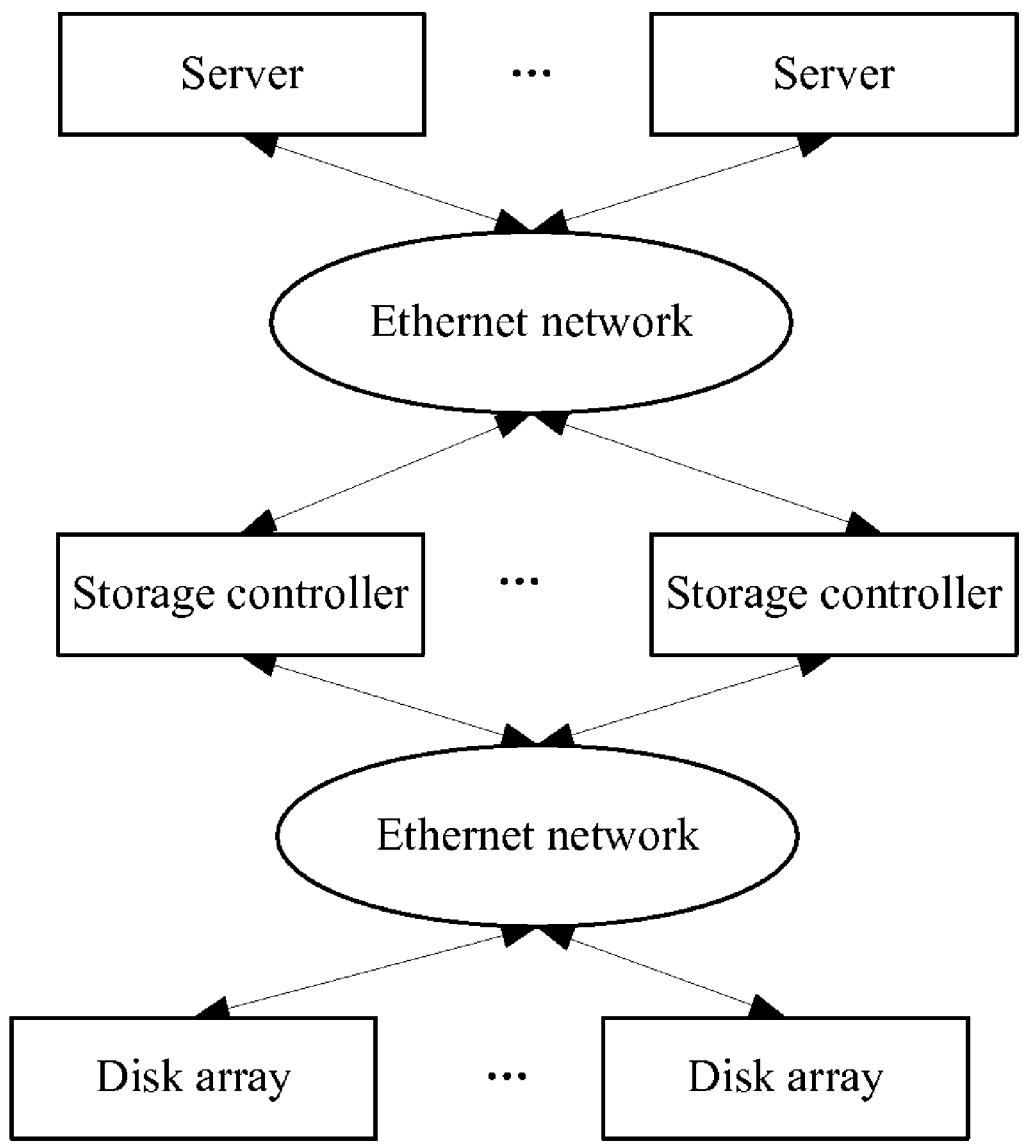
FIG. 1 is a schematic diagram illustrating the structure of an IP SAN system.
Figure 2:
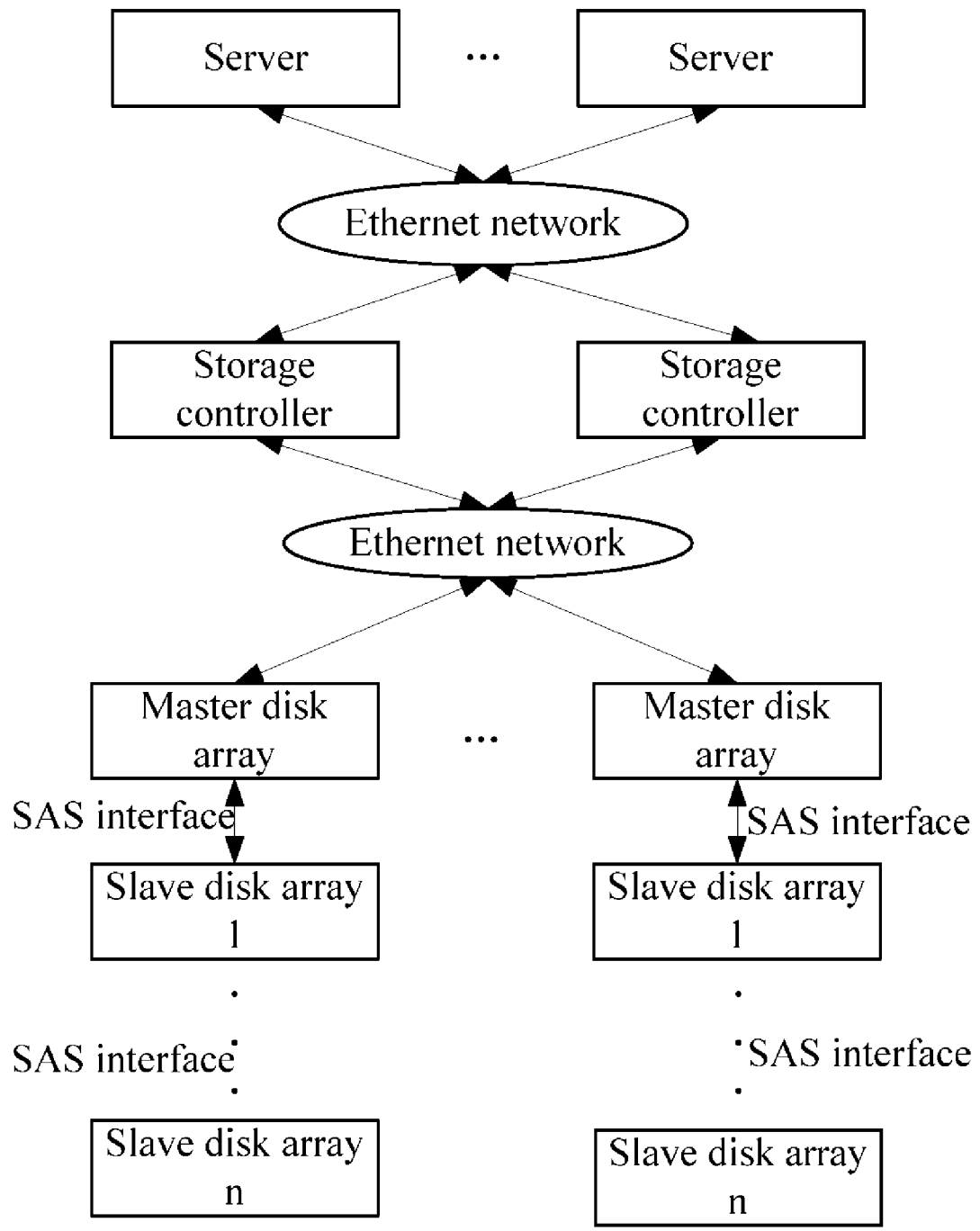
FIG. 2 is a schematic diagram illustrating an IP SAN system for expanding disk capacity in the prior art.
Figure 3:
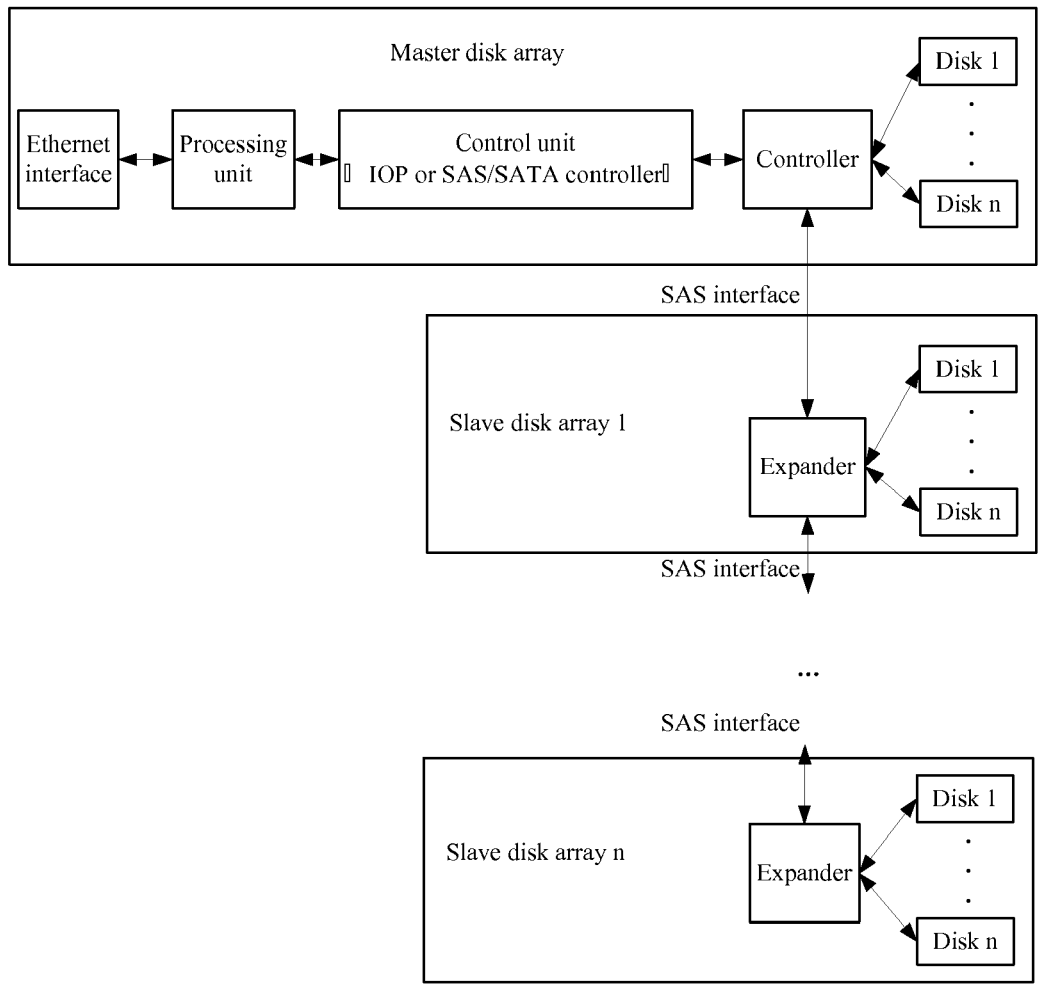
FIG. 3 is a schematic diagram illustrating the connection between a master disk array and slave disk arrays in the prior art.
Figure 4:
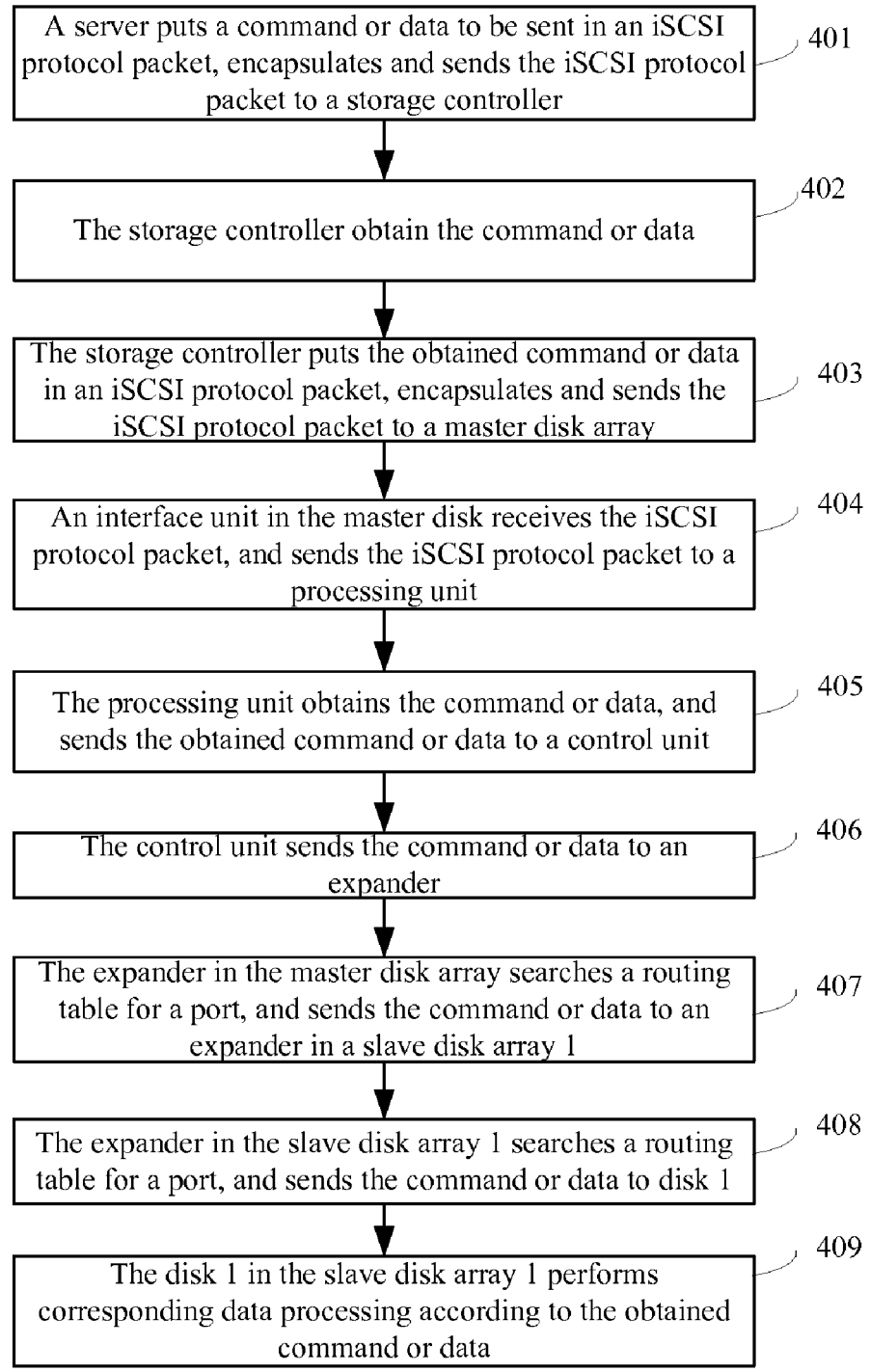
FIG. 4 is a flow chart of accessing a target disk using the IP SAN system shown in FIG. 2 in the prior art.
Figure 5A:
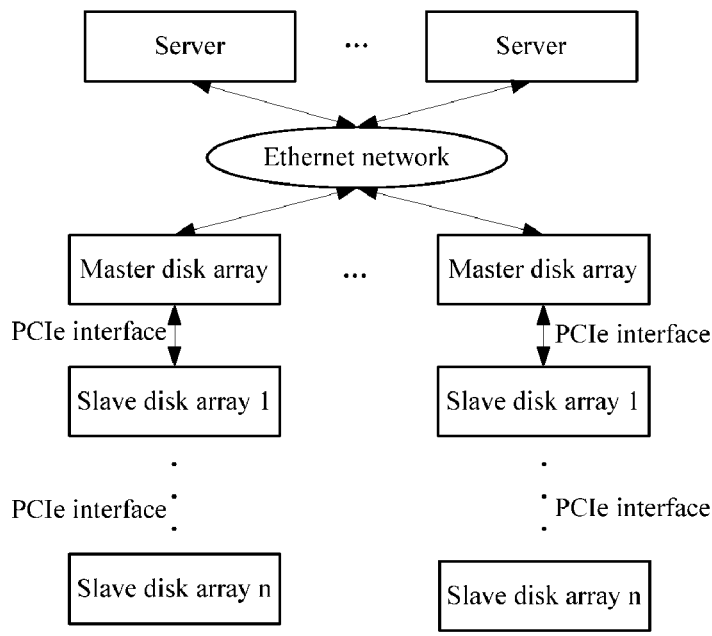
FIG. 5A is a schematic diagram illustrating a basic structure of a system for expanding disk capacity according to an embodiment of the present invention.
Figure 5B:
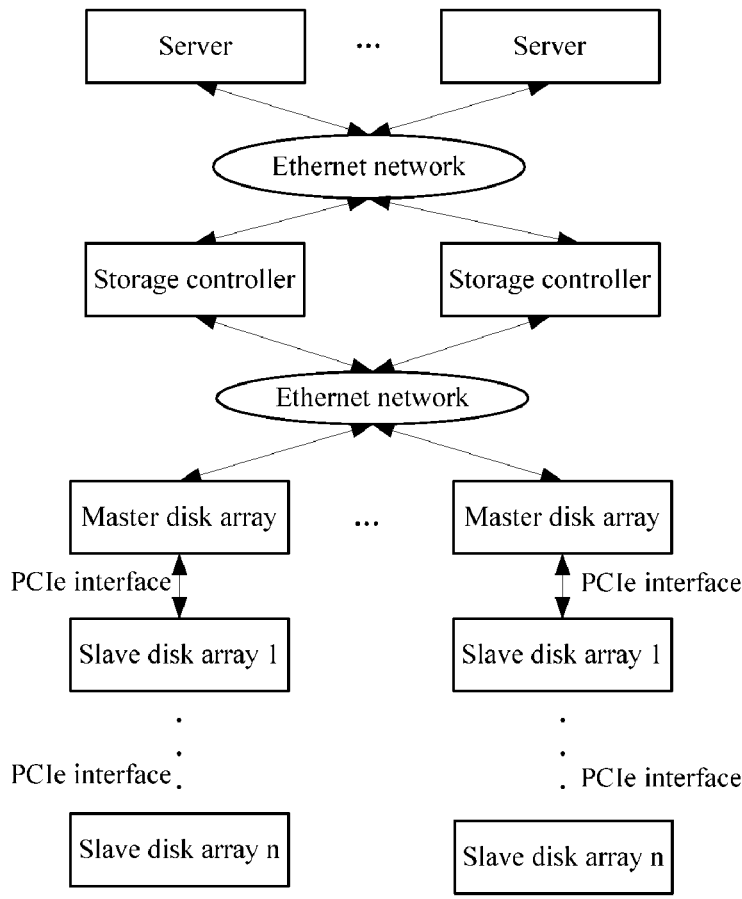
FIG. 5B is a schematic diagram illustrating an optimized structure of a system for expanding disk capacity according to an embodiment of the present invention.

With the above considerations, the present invention provides a system for expanding disk capacity. FIG. 5A is a schematic diagram illustrating a basic structure of a system for expanding disk capacity according to an embodiment of the present invention. Referring to FIG. 5A, the system for expanding disk capacity provided in the present invention mainly includes: at least one server, an Ethernet network, at least one master disk array, and slave disk arrays cascaded to the master disk array. Each of the at least one server is connected to the master disk array through the Ethernet network. FIG. 5B is a schematic diagram illustrating an optimized structure of a system for expanding disk capacity according to an embodiment of the present invention. Referring to FIG. 5B, in order to facilitate the service processing on the received data or commands, the system for expanding disk capacity according to the embodiment of the present invention may also include at least one storage controller. Each of the at least one server is connected to a storage controller through the Ethernet network, and the storage controller is connected to the master disk array through the Ethernet network.

Figure 6:
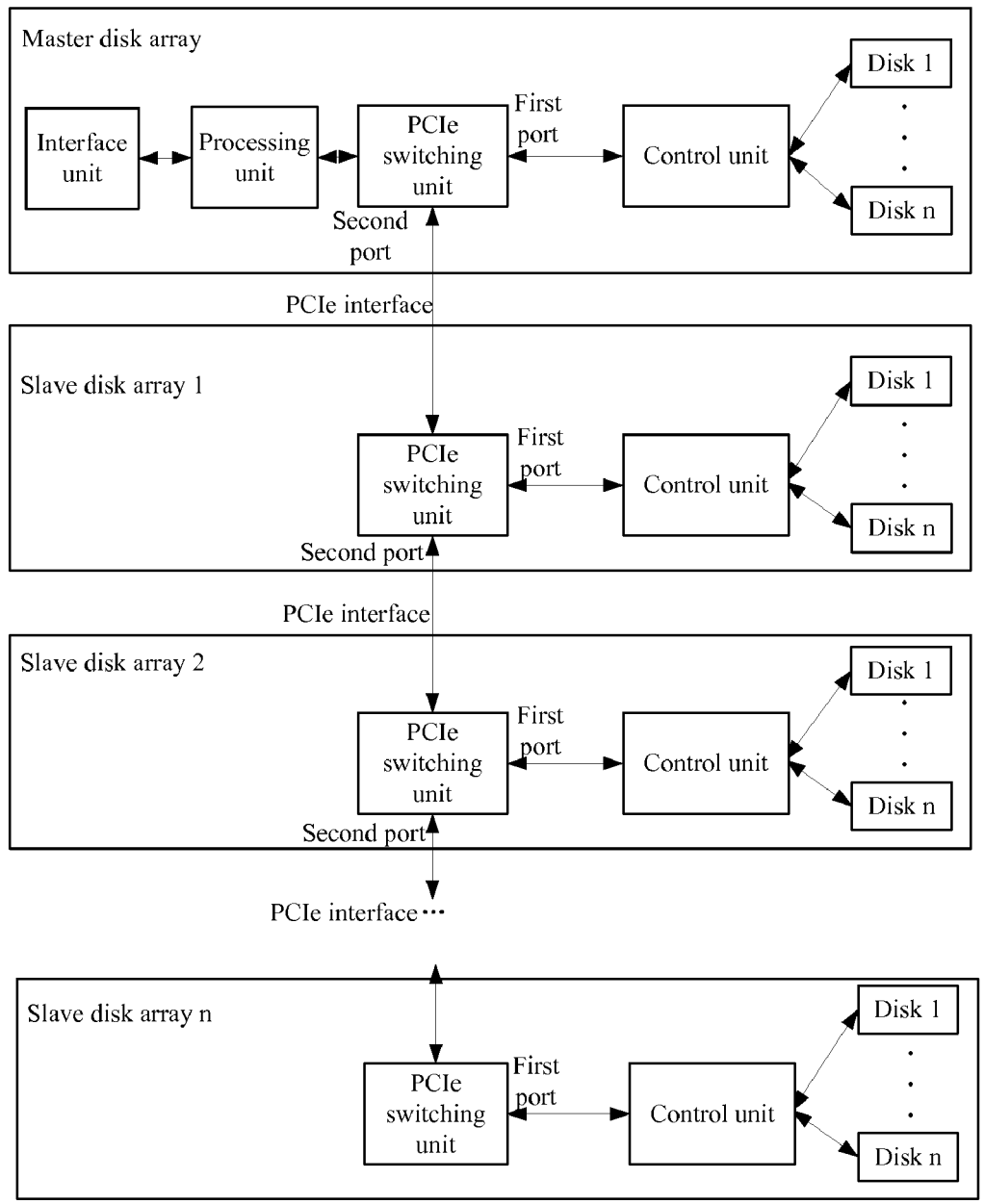
FIG. 6 is a schematic diagram illustrating the connection between a master disk array and slave disk arrays according to an embodiment of the present invention.

FIG. 6 is a schematic diagram illustrating the connection between master disk array and slave disk arrays according to an embodiment of the present invention. Referring to FIGS. 5A, 5B and 6, in the system according to an embodiment of the present invention, the master disk array is connected to the slave disk arrays and the slave disk arrays are connected to each other through a PCIe switching unit, respectively.

The master disk array includes an interface unit, a processing unit, a PCIe switching unit, a control unit, and at least one disk. The interface unit is connected directly to the processing unit, and provides a standard Ethernet interface. The PCIe switching unit is connected directly to the processing unit and the control unit respectively. The control unit is connected directly to the at least one disk.

The slave disk array includes a PCIe switching unit, a control unit, and at least one disk. The PCIe switching unit is connected directly to the control unit. The control unit is connected directly to the at least one disk.

Referring to FIGS. 5A, 5B and 6, in the system according to an embodiment of the present invention, the processing unit of the master disk array is adapted to send a command or data to the PCIe switching unit of the master disk array upon receipt of the command or data.

The PCIe switching unit in each of the disk arrays is adapted to, upon receipt of the command or data, send the command or data to its first port via which the PCIe switching unit is connected directly to the control unit in the disk array and its second port via which the PCIe switching unit is connected directly to a PCIe switching unit on the next stage, and send the received command or data to the control unit in the corresponding disk array via the first port and the second port.

The control unit in any of the disk arrays is adapted to, upon receipt of the command or data, send the command or data to a target disk that is directly connected to the control unit according to the address of the target disk indicated in the command or data.

Each disk in the master disk array or slave disk arrays is adapted to, upon receipt of the command or data, perform an appropriate operation, such as reading, writing, or scanning, according to the received command or data.

Accordingly, the present invention also provides a method for accessing a target disk. In the method, a PCIe switching unit is provided between the processing unit and the control unit of the master disk array. A PCIe switching unit and a control unit are provided in each of the slave disk arrays. The disk arrays are connected to each other via their respective PCIe switching units. The processing unit of the master disk array sends a command or data to the PCIe switching unit of the master disk array upon receipt of the command or data. The PCIe switching unit of the master disk array sends the received command or data to the control unit in the corresponding disk array according to the address of the target disk indicated in the received command or data. The control unit in the disk array sends the received command or data to the target disk connected directly to this control unit.

To make the objects, the technical solutions and the advantages of the present invention more apparent, the present invention will be further detailed in the embodiments in conjunction with the accompanying drawings.

To implement the present invention, the internal structures of the master disk array and slave disk arrays need to be redesigned. The redesign includes the following four aspects.

1. A PCIe switching unit is provided in the master disk array. The PCIe switching unit is connected to the processing unit and the control unit of the master disk array, respectively. The control unit of the master disk array is connected to the disks of the master disk array.

In an exemplary embodiment of the present invention, the expander conventionally provided in the master disk array may be removed.

2. A PCIe switching unit and a control unit are provided in each of the slave disk arrays. The PCIe switching unit and the control unit in each of the slave disk arrays are connected with each other. The control unit in each of the slave disk arrays is connected to the disks of the respective slave disk array.

In an exemplary embodiment of the present invention, the expander conventionally provided in the slave disk array may be removed.

In addition, because both the conventional processing unit and the conventional control unit support PCIe interface, the PCIe switching unit may be connected to the processing unit or control unit via a PCIe interface in the above procedure.

3. The disk arrays are connected to each other.

Referring to FIG. 6, different disk arrays are connected to each other via their respective PCIe switching units. The PCIe switching units in different disk arrays are connected to each other via a PCIe interface.

For the convenience of description, in the embodiments of the present invention, a port of the PCIe switching unit in each of the disk arrays to be connected to the control unit in the same disk array is referred to as a first port, and another port of the PCIe switching unit to be connected to a subsequently cascaded PCIe switching unit is referred to as a second port.

4. In each of the disk arrays including the master disk array and the slave disk arrays, addresses of all the disks in the disk array are mapped to an address space and stored at the first port of the PCIe switching unit in the disk array, and addresses of disks in all subsequent slave disk arrays are mapped to another address space and stored at the second port of the PCIe switching unit in the disk array.

It is understood from the above description that an exemplary embodiment of the present invention may provide a disk array. The disk array includes an expandable switching unit coupled to a processing module and a control unit coupled to the expandable switching unit. Different disk arrays are connected to each other via their respective expandable switching units. In an exemplary embodiment of the present invention, the expandable switching unit is a PCIe switching unit (PCIe Switch). The functions of the processing module and the control unit are the same as those of the above mentioned processing module and control unit, and will not be repeated herein.

Figure 7:
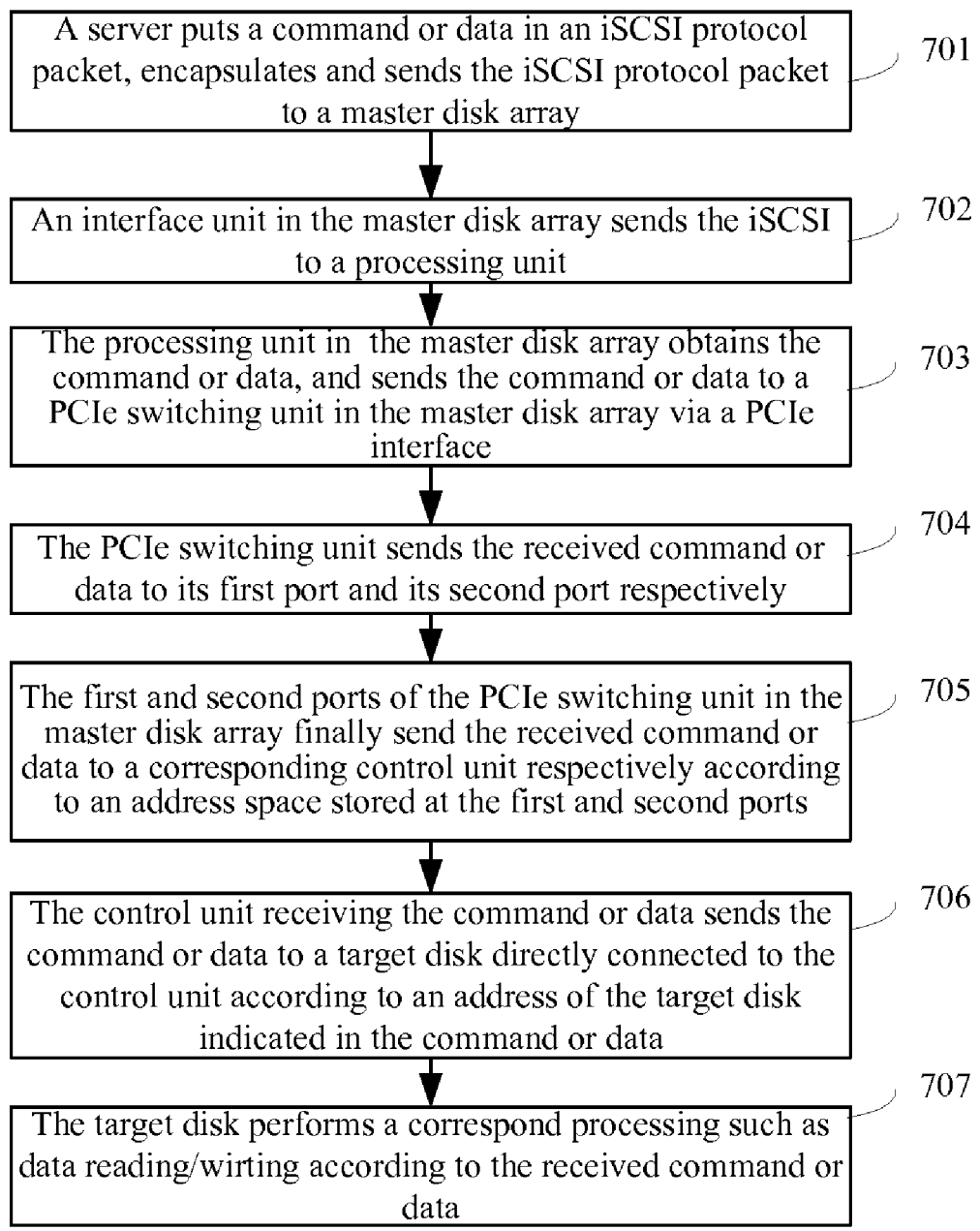
FIG. 7 is a flow chart of accessing a target disk according to an embodiment of the present invention.

FIG. 7 is a flow chart of accessing a target disk according to an embodiment of the present invention. As shown in FIGS. 5A, 5B, 6 and 7, after the internal structures of the master disk array and the slave disk arrays are configured, the method for accessing a target disk according to the embodiment of the present invention includes the following steps.

In step 701, in order to access a particular target disk, the server puts a command or data to be sent in an iSCSI protocol packet, encapsulates the iSCSI protocol packet, and sends the encapsulated iSCSI protocol packet to the master disk array.

In an exemplary embodiment of the present invention, an address of the target disk is carried in the command or data.

With respect to the system as shown in FIG. 5A, sending of the encapsulated iSCSI protocol packet by the server to the master disk array includes that: the server sends the encapsulated iSCSI protocol packet to the storage controller through the Ethernet network; the storage controller decapsulates the received iSCSI protocol packet to obtain the command or data, and performs service processing such as mirroring or snapshot on the obtained command or data; the storage controller puts the obtained command or data in an iSCSI protocol packet, encapsulates the iSCSI protocol packet, and sends the encapsulated iSCSI protocol packet to the master disk array through the Ethernet network.

With respect to the system as shown in FIG. 5B, the server sends the encapsulated iSCSI protocol packet directly to the master disk array through the Ethernet network.

In step 702, the interface unit of the master disk array receives the iSCSI protocol packet, and sends the iSCSI protocol packet to the processing unit of the master disk array.

In step 703, the processing unit of the master disk array decapsulates the received iSCSI protocol packet and parses the iSCSI protocol to obtain the command or data, and sends the obtained command or data to the PCIe switching unit of the master disk array via a PCIe interface.

In step 704, the PCIe switching unit of the master disk array sends the received command or data to its first and second ports, respectively.

In step 705, the first and second ports of the PCIe switching unit of the master disk array finally send the received command or data to an appropriate control unit according to the address space stored at the first and the second ports, respectively.

Specifically, the first port of the PCIe switching unit of the master disk array determines whether the address of the target disk carried in the received command or data is in the range of the address space stored at the first port. If the address is in the range of the address space, the first port sends the received command or data to the control unit of the master disk array, and step 705 is terminated. If the address is not in the range of the address space, the first port does not forward the command or data.

In addition, the second port of the PCIe switching unit of the master disk array determines whether the address of the target disk carried in the received command or data is in the range of the address space stored at the second port. If the address is not in the range of the address space, the second port of the PCIe switching unit of the master disk array does not forward the command or data. If the address is in the range of the address space, the second port of the PCIe switching unit of the master disk array sends the command or data to a PCIe switching unit in slave disk array 1 which is on the next stage and directly connected to the second port. The PCIe switching unit in slave disk array 1 sends the received command or data to its first and second ports simultaneously. On the basis of the above process of this step, the received command or data is finally sent to the control unit in a corresponding disk array through being forwarded via the first port or the second port of the PCIe switching unit in slave disk array 1.

In step 706, the control unit that receives the command or data sends the command or data to the target disk directly connected thereto according to the address of the target disk in the command or data.

In step 707, the target disk performs appropriate data processing, such as data reading/writing or data scanning, according to the received command or data.

In an exemplary embodiment of the present invention, the control unit may be an input/output processor (IOP) or an SAS/SATA Controller. If the control unit is an IOP, processing strategies may be configured on the IOP in the present invention, such as RAID strategies or backup strategies. In this way, upon receipt of the command or data from the PCIe switching unit, the IOP may further perform appropriate processing such as mirroring or backup on the command or data according to the pre-configured processing strategies. Then, the IOP sends the command or data to the appropriate disk.

In an exemplary embodiment of the present invention, the PCIe switching unit may be a PCIe switching chip that provides a PCIe interface and is composed of a PCIe switching network. In addition, in another exemplary embodiment of the present invention, the PCIe switching unit may be an ASI device in compliance with Advanced Switching Interconnection (ASI) architecture, because the ASI architecture supports the PCIe protocol, that is, an ASI device includes a PCIe interface and an ASI switching network, and the ASI switching network can bear the PCIe protocol directly using the protocol interface so as to send a command or data directly.

What described above are only preferred embodiments of the present invention and not intend to limit the scope of the present invention thereto. Any modification, alternation or improvement without departing from the spirit and principle of the present invention should fall into the scope of the present invention.

The invention claimed is:

1. A method for accessing a target disk, wherein a Peripheral Component Interconnect Express, PCIe, switching unit is provided between a processing unit and a control unit of a master disk array, a PCIe switching unit and a control unit are provided in a slave disk array, and the disk arrays are connected to each other via their respective PCIe switching units, the method further comprises:
    in each of the disk arrays, mapping addresses of all the disks in the disk array to an address space and storing the address space at a first port of the PCIe switching unit in the disk array via which the PCIe switching unit is connected directly to the control unit in the disk array, and mapping addresses of disks in all subsequently cascaded slave disk arrays to another address space and storing the another address space at a second port of the PCIe switching unit in the disk array via which the PCIe switching unit is connected to a PCIe switching unit on the next stage;
    obtaining, by the processing unit of the master disk array, a command or data, and sending, by the processing unit, the obtained command or data to the PCIe switching unit of the master disk array;
    sending, by the PCIe switching unit of the master disk array, the command or data to a control unit in a corresponding disk array according to an address of the target disk indicated in the received command or data comprising:
        sending, by the PCIe switching unit of the master disk array, the received command or data to its first port and second port; and
        determining, respectively by the first and second ports of the PCIe switching unit of the master disk array, whether the address of the target disk indicated in the received command or data is in the range of address space stored at their respective first and second ports; if the address is in the range of the address space, sending the received command or data directly to the control unit in a corresponding disk array, otherwise not forwarding the received command or data; and
    sending, by the control unit in the corresponding disk array, the received command or data to the target disk that is directly connected to the control unit in the corresponding disk array.

2. A system for expanding disk capacity, comprising at least one server, an Ethernet network, at least one master disk array and slave disk arrays cascaded to the master disk array, the server being adapted to put a command or data in an Internet Small Computer Systems Interface, iSCSI, protocol packet, encapsulate the iSCSI protocol packet, and send the encapsulated iSCSI protocol packet to an interface unit of the master disk array through the Ethernet network, wherein
    the master disk array further comprises a processing unit, a Peripheral Component Interconnect Express, PCIe, switching unit, a control unit and at least one disk; in the master disk array, the PCIe switching unit is connected directly to the processing unit and the control unit respectively, and the control unit is directly connected to each of disks; the slave disk array comprises a PCIe switching unit, a control unit and at least one disk; in the slave disk array, the control unit is connected directly to the PCIe switching unit and each of disks; the disk arrays are directly connected to each other via their respective PCIe switching units;
    the processing unit of the master disk array is adapted to obtain the command or data from the iSCSI protocol packet sent from the interface unit of the master disk array, and send the command or data to the PCIe switching unit of the master disk array;
    the PCIe switching unit in each of the disk arrays is adapted to, upon receipt of the command or data, send the command or data to its first port via which the PCIe switching unit is connected directly to the control unit in the disk array and its second port via which the PCIe switching unit is connected to a PCIe switching unit on the next stage, and the received command or data is sent to a control unit in a corresponding disk array via the first port and the second port; and
    the control unit in any of the disk arrays is adapted to, upon receipt of the command or data, send the command or data to a target disk that is directly connected to the control unit, according to an address of the target disk indicated in the command or data.

3. The system according to claim 2, wherein the first port of the PCIe switching unit in each of the disk arrays is adapted to store an address space to which addresses of all disks in the disk array are mapped, and determine, upon receipt of the command or data, whether the address of the target disk indicated in the command or data is in the range of the address space stored at the first port; if the address of the target disk is in the range of the address space stored at the first port, the first port sends the received command or data to a control unit that is in the disk array and connected directly to the first port; and
    the second port of the PCIe switching unit in each of the disk arrays is adapted to store an address space to which addresses of all disks in the disk arrays on subsequent stages, and determine, upon receipt of the command or data, whether the address of the target disk indicated in the command or data is in the range of the address space stored at the second port; if the address of the target disk is in the range of the address space stored at the second port, the second port sends the received command or data to a PCIe switching unit that is in a disk array on a subsequent stage and is directly connected to the second port.

4. The system according to claim 2, wherein the PCIe switching unit is a PCIe switching chip with a PCIe interface and a switching network, or an Advanced Switching Interconnection, ASI, device in compliance with ASI architecture.

5. The system according to claim 2, wherein the control unit is an input/output processor, IOP, or a Serial Attached SCSI/Serial Advanced Technology Attachment, SAS/SATA, Controller.

6. The system according to claim 2, wherein the system further comprises at least one storage controller, wherein the at least one server is connected to one of the at least one storage controller through the Ethernet network, and the storage controller is connected to the master disk array through the Ethernet network.

7. A master disk array, comprising an interface unit, a processing unit, a Peripheral Component Interconnect Express, PCIe, switching unit, a control unit and at least one disk, wherein the PCIe switching unit is connected directly to the processing unit and the control unit respectively, and the control unit is connected directly to each of the at least one disk; and the processing unit is adapted to send a command or data to the PCIe switching unit upon receipt of the command or data;

the PCIe switching unit is adapted to send the received command or data to its first port via which the PCIe switching unit is connected directly to the control unit and its second port via which the PCIe switching unit is connected directly to a PCIe switching unit on a subsequent stage, and send the received command or data via the first port and the second port; and the control unit is adapted to, upon receipt of the command or data, send the command or data to a target disk that is directly connected to the control unit, according to an address of the target disk indicated in the command or data.

8. The master disk array according to claim 7, wherein the first port of the PCIe switching unit is adapted to store an address space to which addresses of all disks of the master disk array are mapped, and determine, upon receipt of the command or data, whether the address of the target disk indicated in the command or data is in the range of the address space stored at the first port; if the address of the target disk is in the range of the address space stored at the first port, the first port sends the received command or data to the control unit of the master disk array.

9. The master disk array according to claim 7, wherein the second port of the PCIe switching unit is adapted to store an address space to which addresses of all disks in slave disk arrays on subsequent stages, and determine, upon receipt of the command or data, whether the address of the target disk indicated in the command or data is in the range of the address space stored at the second port; if the address of the target disk is in the range of the address space stored at the second port, the second port sends the received command or data to a PCIe switching unit that is in an external slave disk array and is directly connected to the second port.

10. The master disk array according to claim 7, wherein the PCIe switching unit is a PCIe switching chip with a PCIe interface and a switching network, or an Advanced Switching Interconnection, ASI, device in compliance with ASI architecture.

11. The master disk array according to claim 7, wherein the control unit is an input/output processor, IOP, or a Serial Attached SCSI/Serial Advanced Technology Attachment, SAS/SATA, Controller.

12. A slave disk array, comprising a Peripheral Component Interconnect Express, PCIe, switching unit, a control unit and at least one disk, wherein the PCIe switching unit is connected directly to the control unit, and the control unit is connected directly to each of the at least one disk; and the PCIe switching unit is adapted to send a received command or data to its first port via which the PCIe switching unit is connected directly to the control unit and its second port via which the PCIe switching unit is connected directly to a PCIe switching unit on a subsequent stage, and send the received command or data via the first port and the second port; and the control unit is adapted to, upon receipt of the command or data, send the command or data to a target disk that is directly connected to the control unit, according to an address of the target disk indicated in the command or data.

13. The slave disk array according to claim 12, wherein the first port of the PCIe switching unit is adapted to store an address space to which addresses of all disks of the slave disk array are mapped, to determine, upon receipt of the command or data, whether the address of the target disk indicated in the command or data is in the range of the address space stored at the first port, and to send the received command or data to the control unit of the slave disk array if the address of the target disk is in the range of the address space stored at the first port.

14. The slave disk array according to claim 12, wherein the second port of the PCIe switching unit is adapted to store an address space to which addresses of all disks in slave disk arrays on subsequent stages, to determine, upon receipt of the command or data, whether the address of the target disk indicated in the command or data is in the range of the address space stored at the second port, and to send the received command or data to a PCIe switching unit that is in an external slave disk array and is directly connected to the second port if the address of the target disk is in the range of the address space stored at the second port.

15. The slave disk array according to claim 12, 13 or 14, wherein the PCIe switching unit is a PCIe switching chip with a PCIe interface and a switching network, or an Advanced Switching Interconnection, ASI, device in compliance with ASI architecture.

16. The slave disk array according to claim 12, 13 or 14, wherein the control unit is an input/output processor, IOP, or a Serial Attached SCSI/Serial Advanced Technology Attachment, SAS/SATA, Controller.

* * * * *